US009635202B2

(12) United States Patent
Tomatsu

(10) Patent No.: US 9,635,202 B2
(45) Date of Patent: Apr. 25, 2017

(54) IMAGE FORMING APPARATUS WITH RETAINER FOR PIVOTING DOCUMENT READER UNIT

(71) Applicant: Brother Kogyo Kabushiki Kaisha, Nagoya-shi, Aichi-ken (JP)

(72) Inventor: Yoshiya Tomatsu, Kasugai (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 15/080,002

(22) Filed: Mar. 24, 2016

(65) Prior Publication Data

US 2016/0286062 A1 Sep. 29, 2016

(30) Foreign Application Priority Data

Mar. 26, 2015 (JP) ................................ 2015-065365

(51) Int. Cl.
*H04N 1/00* (2006.01)
*G03G 15/00* (2006.01)

(52) U.S. Cl.
CPC ......... *H04N 1/00551* (2013.01); *G03G 15/60* (2013.01); *H04N 1/00554* (2013.01); *G03G 2221/1687* (2013.01); *H04N 2201/0094* (2013.01)

(58) Field of Classification Search
CPC ............... G03G 15/60; G03G 21/1628; G03G 2221/1687; H04N 1/00551; H04N 1/00554; H04N 2201/0094; E05D 11/1064

USPC .......... 399/367; 358/498; 16/323, 343, 345, 16/346, 348
See application file for complete search history.

(56) References Cited

U.S. PATENT DOCUMENTS

| 573,197 | A | * | 12/1896 | Bartelmes | ........................ 16/294 |
| 1,552,723 | A | * | 9/1925 | Mielenz | .................... E06B 5/01 16/348 |
| 4,470,170 | A | * | 9/1984 | Gerteis | ..................... E05D 3/16 16/334 |
| 5,045,885 | A | * | 9/1991 | Nishio | ............... G03G 21/1628 399/117 |
| 7,047,600 | B2 | * | 5/2006 | Muir | ...................... E05D 15/30 16/346 |

(Continued)

FOREIGN PATENT DOCUMENTS

JP 10056530 A * 2/1998
JP 2004-045585 A 2/2004

(Continued)

*Primary Examiner* — Robert Beatty
(74) *Attorney, Agent, or Firm* — Banner & Witcoff, Ltd.

(57) ABSTRACT

An image forming apparatus, having an image forming unit, a document reader unit pivotable on the image forming unit through a hinge, a retainer to retain the document reader unit in the open position, is provided. The retainer includes a first link member rotatably coupled with the image forming unit and the document reader unit through a first coupling section and a second coupling section; a second link member rotatably coupled with the image forming unit and the document reader unit through a third coupling section and a fourth coupling section; and a tension coil spring. The first link member includes a first contacting part that faces and contacts the second link member along a tensile direction of the tension coil spring when the document reader unit is in a closed position.

11 Claims, 11 Drawing Sheets

(56) References Cited

U.S. PATENT DOCUMENTS

| | | | |
|---|---|---|---|
| 8,606,169 B2* | 12/2013 | Kitayama | G03G 15/60 399/124 |
| 9,083,831 B2 | 7/2015 | Niikawa | |
| 2002/0166208 A1* | 11/2002 | Kondo | E05D 3/06 16/289 |
| 2007/0196128 A1* | 8/2007 | Ishihara | G03G 21/1628 399/125 |
| 2009/0252527 A1* | 10/2009 | Watanabe | G03G 21/1628 399/111 |
| 2011/0134455 A1* | 6/2011 | Nagashima | H04N 1/00543 358/1.13 |
| 2014/0293359 A1 | 10/2014 | Niikawa | |
| 2014/0318291 A1* | 10/2014 | Tsuchiya | F16H 37/12 74/96 |

FOREIGN PATENT DOCUMENTS

| | | | |
|---|---|---|---|
| JP | 2008-304748 A | | 12/2008 |
| JP | 2010107607 A | * | 5/2010 |
| JP | 2013-109094 A | | 6/2013 |
| JP | 2014-209205 A | | 11/2014 |

* cited by examiner

IMAGE FORMING APPARATUS WITH RETAINER FOR PIVOTING DOCUMENT READER UNIT

CROSS REFERENCE TO RELATED APPLICATION

This application claims priority from Japanese Patent Application No. 2015-065365, filed on Mar. 26, 2015, the entire subject matters of which are incorporated herein by reference.

BACKGROUND

Technical Field

An aspect of the present disclosure relates to an image forming apparatus.

Related Art

An image forming apparatus having an image forming unit, a document reader unit, and a retainer is known. The image forming unit may form an image on a recording sheet, a document reader unit may be arranged in an upper position with respect to the image forming unit to read an original document, and the retainer may support the document reader unit pivotably. The retainer may support the document reader unit to pivot between a closed position, in which the document reader unit is placed on the image forming unit, and an open position, in which one end of the document reader unit is lifted upward with respect to the image forming unit. The retainer may, for example, arranged in a position between the image forming unit and the document reader unit, at each end on an edge of the document reader unit along a direction orthogonal to a pivotable direction of the document reader unit. The retainer may include a pair of link members to restrict the pivot movement of the document reader unit and an urging member arranged on each link member to urge the document reader unit toward the open position.

The image forming apparatus may have a sheet-ejection tray formed to dent downward from a top plane of the image forming unit. A sheet with an image formed thereon may be ejected out of the image forming unit from one side, e.g., a rear side, toward the other side, e.g., a front side of the image forming apparatus and placed on the sheet-ejection tray. Further, a sheet-pickup opening, through which a user may insert a hand to pick up the sheet from the ejection tray, may be formed in, for example, an upper-front area with respect to the image forming unit, in a lower area with respect to the document reader unit.

The image forming apparatus may form an image on a sheet based on image data, which may be transmitted from an external device or may be generated from an image read by the document reader unit, and eject the sheet with the image out of the image forming unit at the sheet-ejection tray.

The user may insert a hand through the sheet-pickup opening to reach the sheet on the sheet-ejection tray. Occasionally, for example, when the sheet is placed in a setback area in the sheet-ejection tray, the user may uplift the document reader unit to the open position to visually recognize and pick up the ejected sheet.

SUMMARY

Meanwhile, the urging member in the retainer of the image forming apparatus may be a tension coil spring. The tension coil spring as the urging member may be arranged to be stretched to a largest extent when the document reader unit is in the closed position. Therefore, as long as the document reader unit is in the closed position, which may be a normal condition for the document reader unit, the document reader unit may be urged toward the image forming unit at the largest intensity of urging force from the tension coil spring at all times. In this regard, it may be concerned that the document reader unit affected by the largest intensity of urging force at all times may be at some point displaced or misaligned from the image forming unit.

The present disclosure is advantageous in that an image forming apparatus with a retainer, by which displacement of the document reader unit from the image forming unit by the tension coil spring may be restrained, is provided.

According to an aspect of the present disclosure, an image forming apparatus, having an image forming unit configured to form an image on a recording sheet; a document reader unit disposed above the image forming unit and pivotably supported by the image forming unit through a hinge, the document reader unit being configured to pivot between a closed position and an open position; and a retainer configured to retain the document reader unit in the open position, is provided. The retainer includes a first link member configured to be rotatably coupled with the image forming unit through a first coupling section and with the document reader unit through a second coupling section; a second link member arranged in a position farther from the hinge than the first link member, the second link member being configured to be rotatably coupled with the image forming unit through a third coupling section and with the document reader unit through a fourth coupling section; and a tension coil spring configured to couple the first link member and the second link member with each other. The first link member includes a first contacting part, the first contacting part being arranged to face and contact the second link member along a tensile direction of the tension coil spring when the document reader unit is in the closed position.

According to an aspect of the present disclosure, an image forming apparatus, having an image forming unit configured to form an image on a recording sheet; a document reader unit disposed above the image forming unit and pivotably supported by the image forming unit through a hinge, the document reader unit being configured to pivot between a closed position and an open position; and a retainer configured to retain the document reader unit in the open position, is provided. The retainer includes a first link member configured to be rotatably coupled with the image forming unit through a first coupling section and with the document reader unit through a second coupling section; a second link member arranged in a position farther from the hinge than the first link member, the second link member being configured to be rotatably coupled with the image forming unit through a third coupling section and with a middle area of the first link member through a fourth coupling section; and a tension coil spring configured to couple the first link member and the second link member with each other. The second link member includes a first contacting part, the first contacting part being arranged to face and contact a projection formed in the middle area of the first link member along a tensile direction of the tension coil spring when the document reader unit is in the closed position.

BRIEF DESCRIPTION OF THE ACCOMPANYING DRAWINGS

Figure 7A:
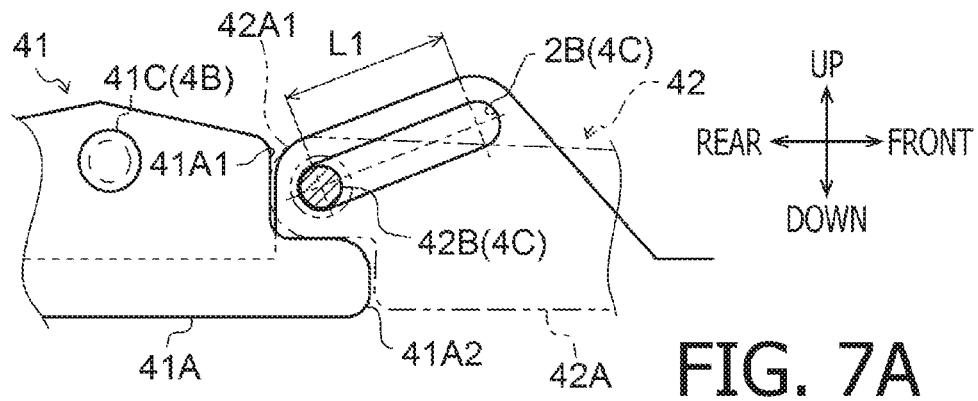
Figure 7B:
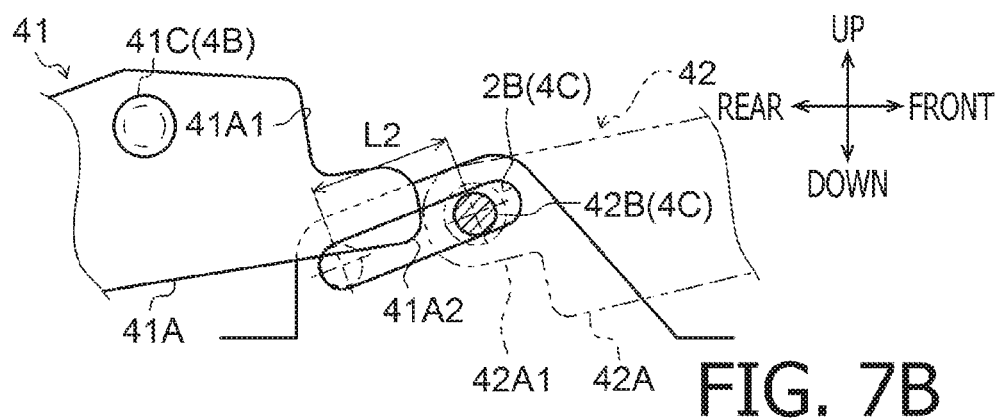
Figure 7C:
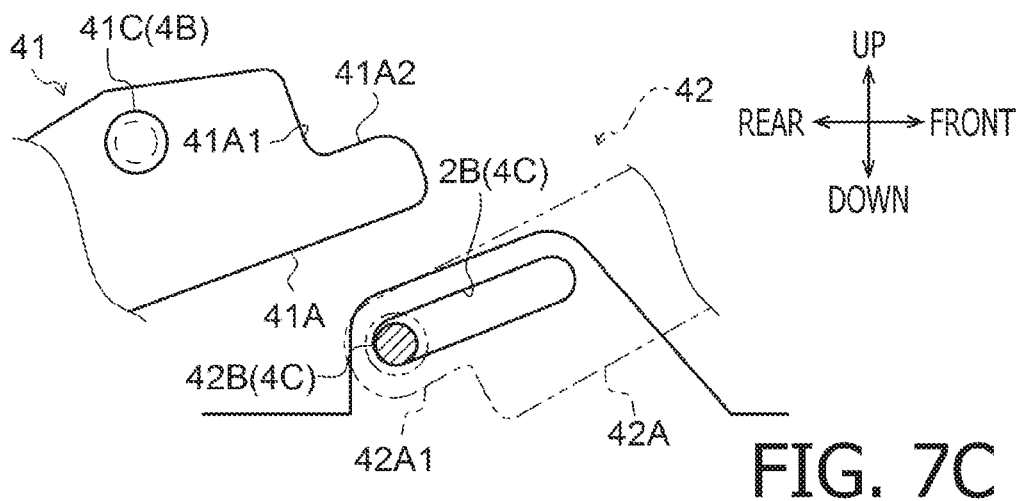

FIG. 7A is a side view of a second coupling section and a third coupling section in the retainer when the document reader unit is in the closed position in the image forming apparatus according to the first embodiment of the present disclosure. FIG. 7B is a side view of the second coupling section and the third coupling section in the retainer, when a contact part in the second link member is pushed by a second contacting part in the first link member, in the image forming apparatus according to the first embodiment of the present disclosure. FIG. 7C is a side view of the second coupling section and the third coupling section in the retainer, when the second contacting part in the first link member climbed over the contact part in the second link member, when the document reader unit is moved beyond a predetermined position to be closer to the open position, in the image forming apparatus according to the first embodiment of the present disclosure.

Figure 8:
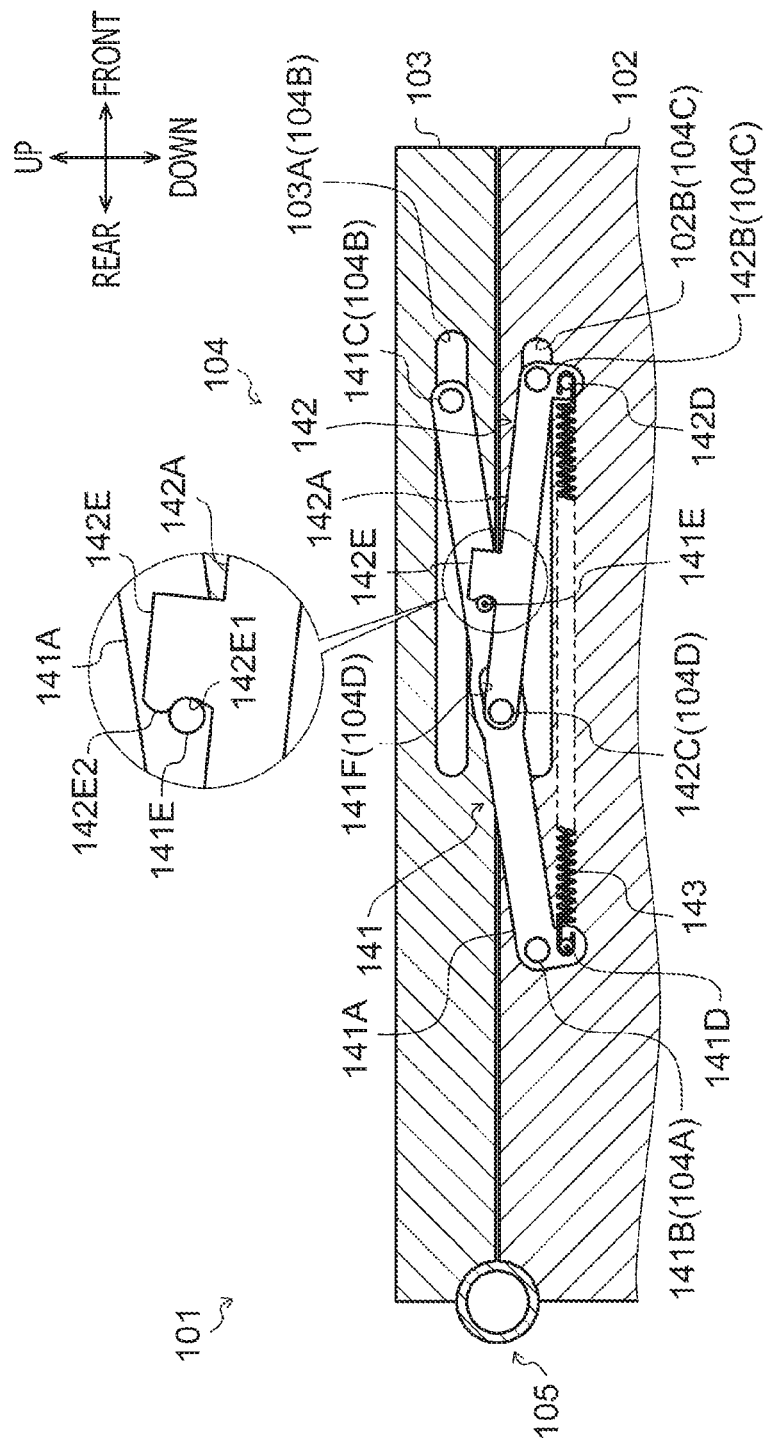

FIG. 8 is a side view of the retainer device, when the document reader unit is in the closed position, in the image forming apparatus according to a second embodiment of the present disclosure.

Figure 9:
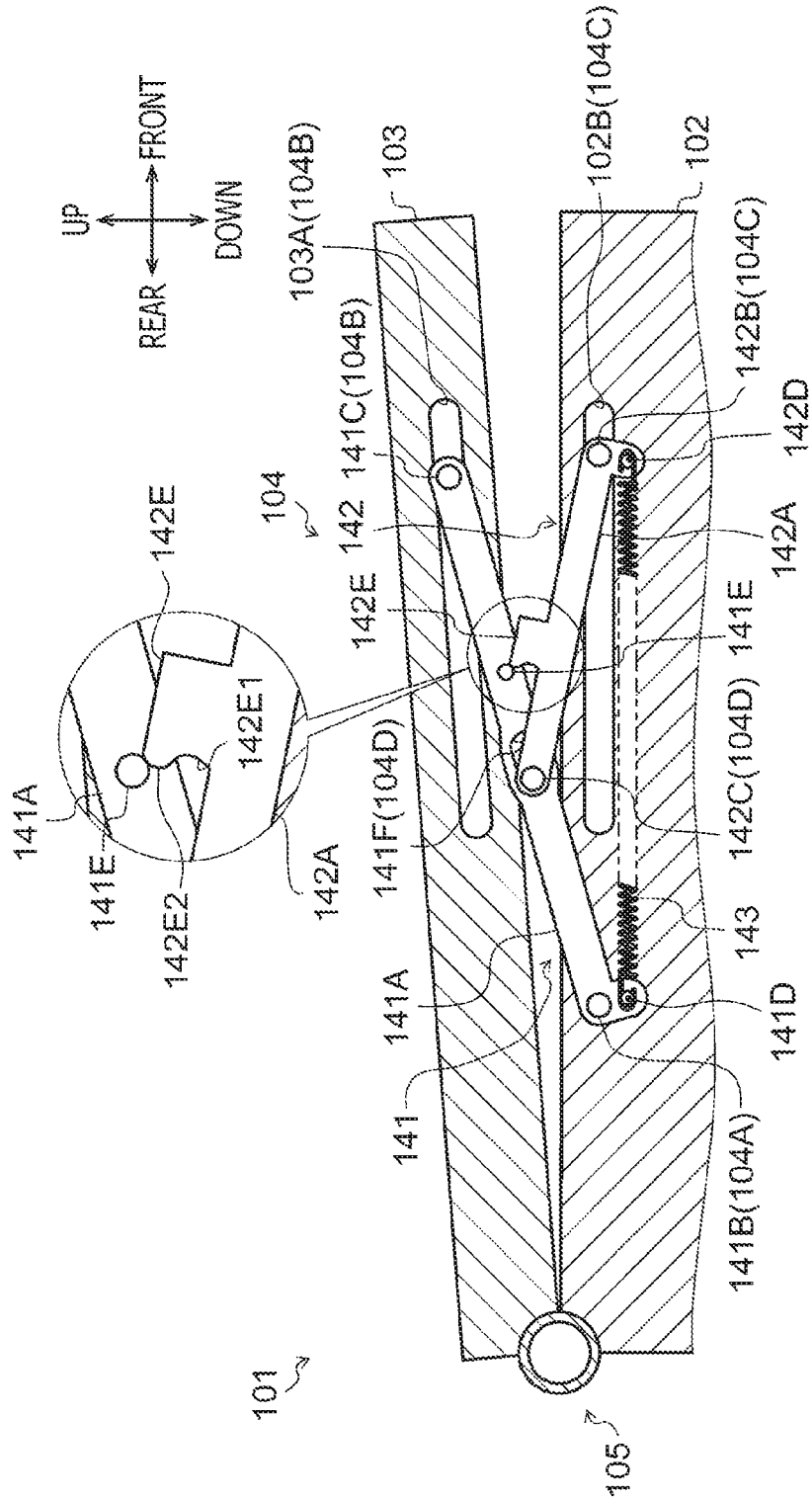

FIG. 9 is a side view of the retainer, when the document reader unit is in proximity to the closed position, in the image forming apparatus according to the second embodiment of the present disclosure.

Figure 10:
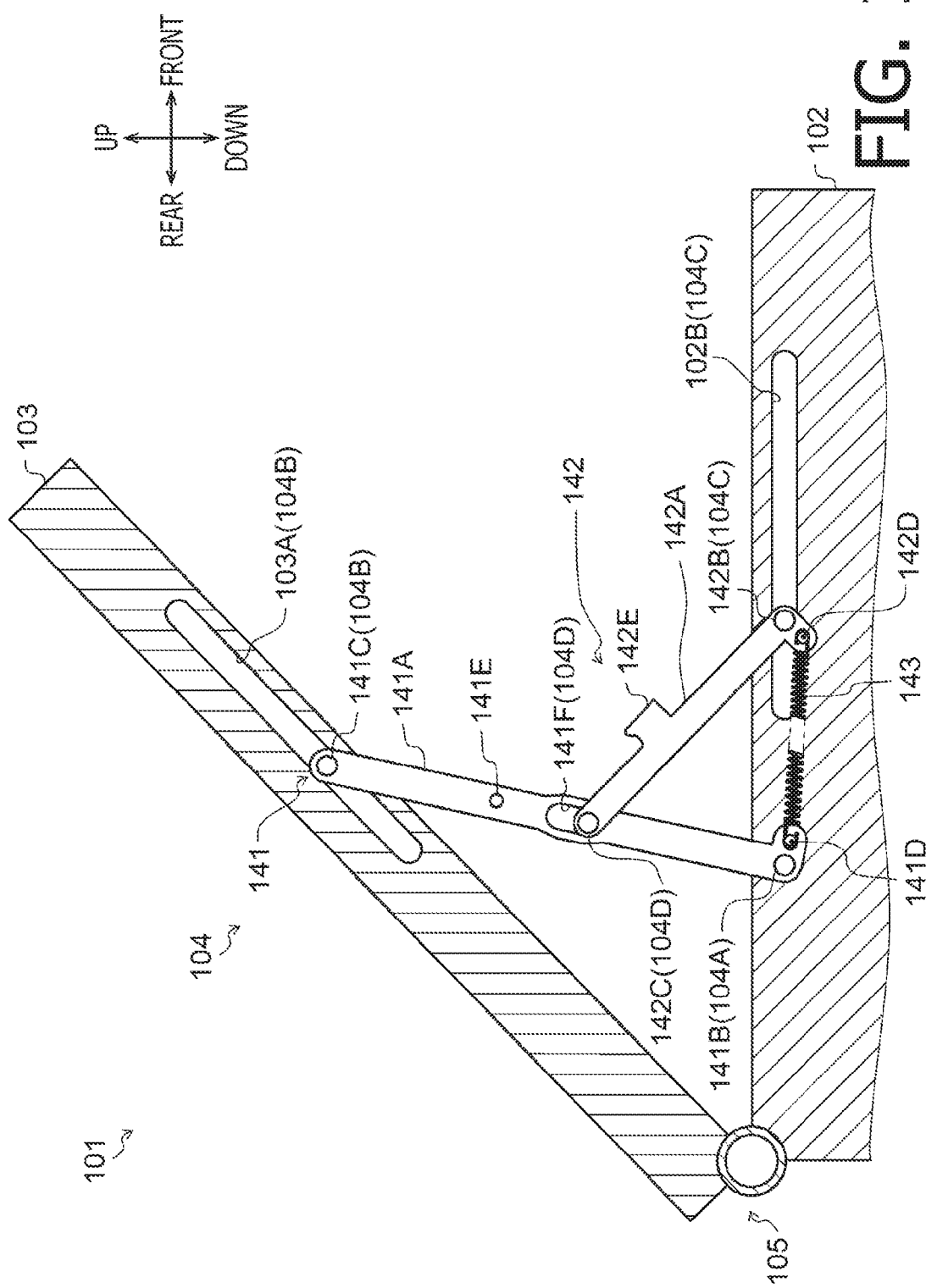

FIG. 10 is a side view of the retainer, when the document reader unit is in the open position, in the image forming apparatus according to the second embodiment of the present disclosure.

Figure 11:
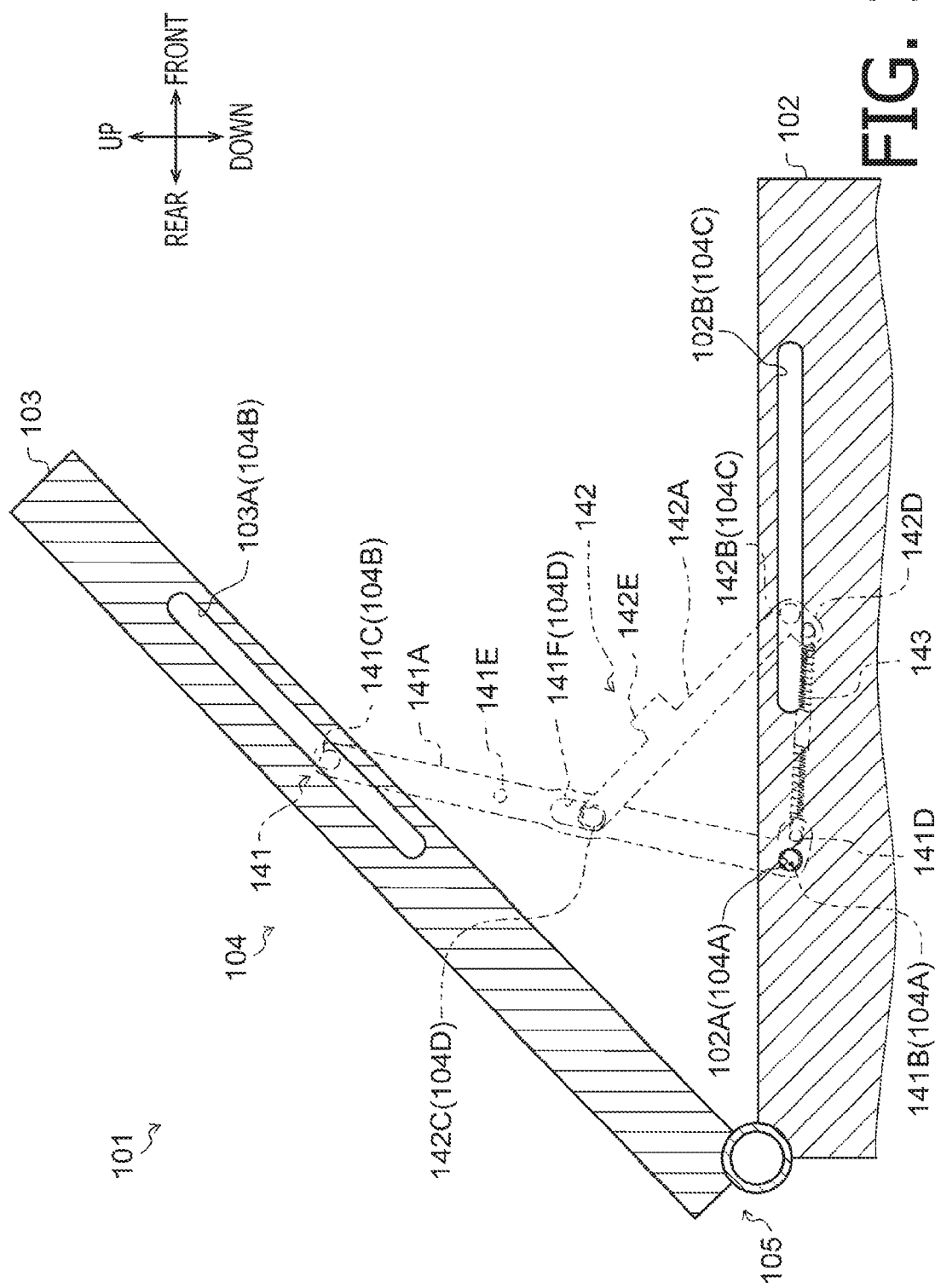

FIG. 11 is a side view of the image forming unit and the document reader unit with holes to be coupled with the retainer, when the document reader unit is in the open position, in the image forming apparatus according to the second embodiment of the present disclosure.

DETAILED DESCRIPTION

Hereinafter, image forming apparatuses 1, 101 according to embodiments of the present disclosure will be described with reference to the accompanying drawings. It is noted that various connections may be set forth between elements in the following description. These connections in general, and unless specified otherwise, may be direct or indirect, and this specification is not intended to be limiting in this respect.

In the following description, identical structures, parts, or items may be referred to by a same reference sign, and redundant explanation of those will be omitted. A quantity of each element, part, or item is, unless specified otherwise, at least one. The embodiments may not necessarily be limited to the configurations described below.

Figure 1:
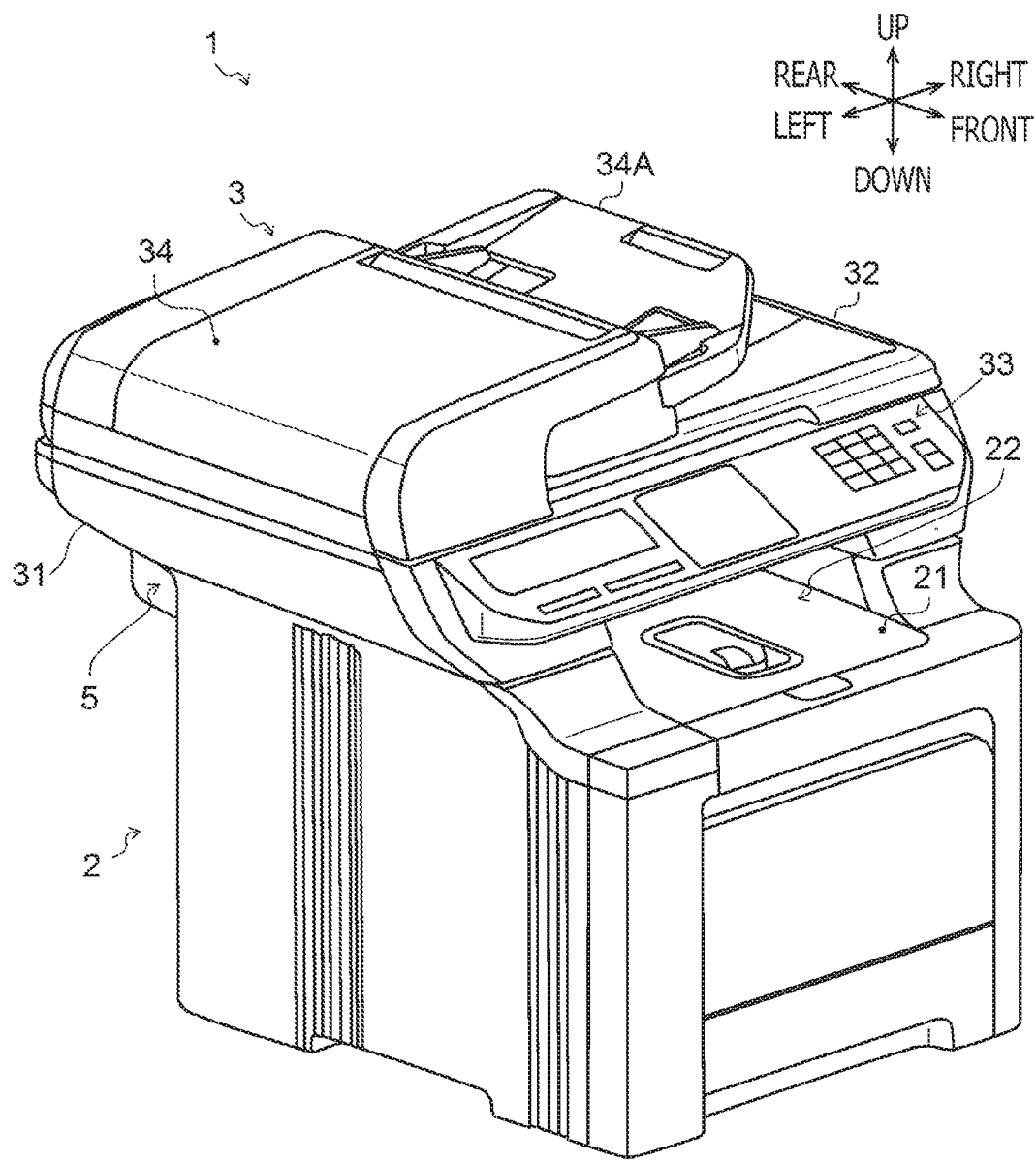
FIG. 1 is an overall perspective view of an image forming apparatus according to a first embodiment of the present disclosure with a document reader unit in a closed position.
Figure 2:
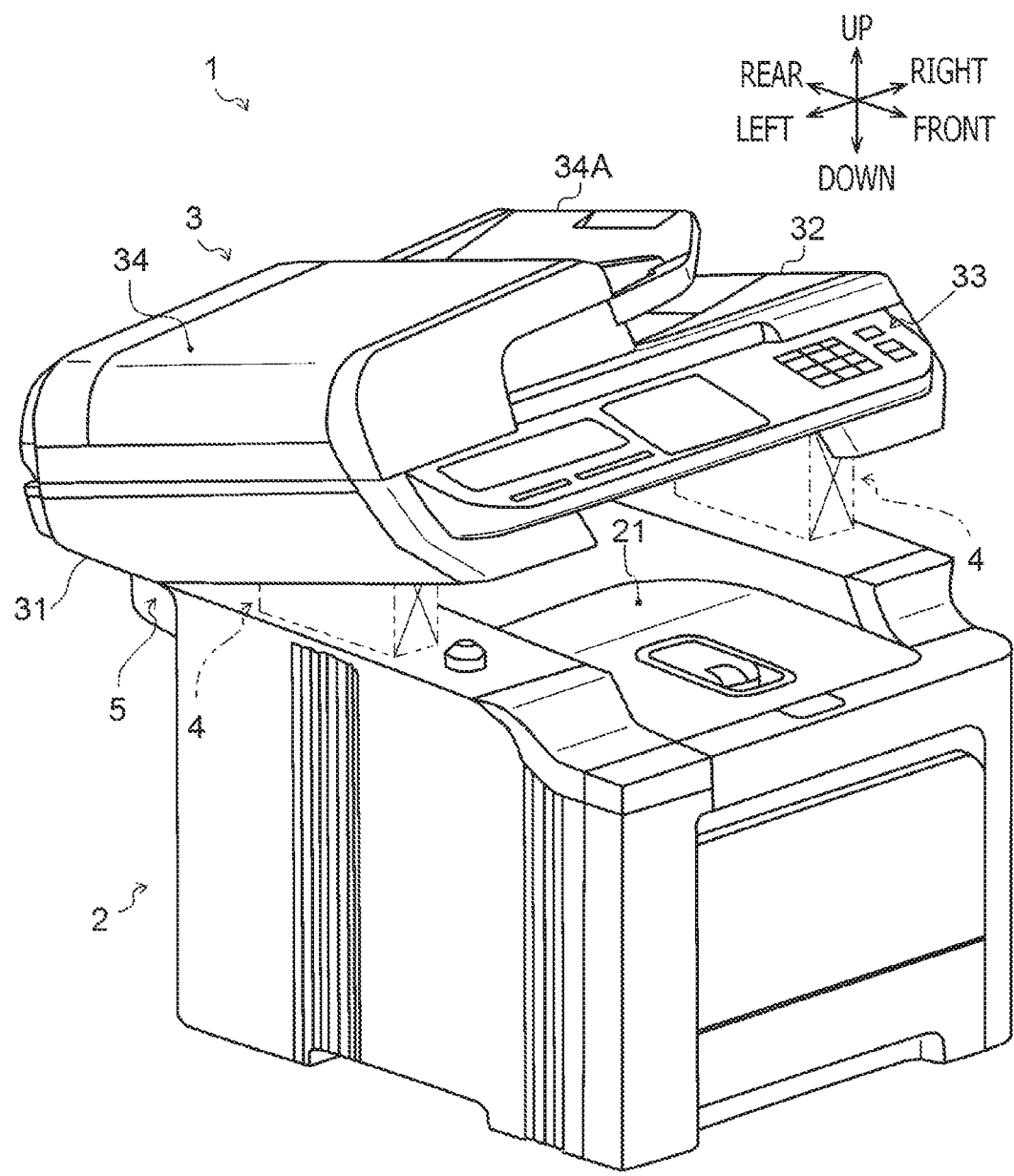
FIG. 2 is an overall perspective view of the image forming apparatus according to the first embodiment of the present disclosure with the document reader unit in an open position.

Directions concerning the image forming apparatuses 1, 101 will be referred to in accordance with a user's ordinary position to use the image forming apparatuses 1, 101, as indicated by arrows in each drawing. For example, a viewer's lower-right side appearing in FIGS. 1-2 is referred to as a front side of the image forming apparatuses 1, 101, and an upper-left side in FIGS. 1-2 opposite from the front side is referred to as a rear side. A side which corresponds to the viewer's upper-right side is referred to as a right-hand side for the user, and an opposite side from the right, which corresponds to the viewer's lower-left side is referred to as a left-hand side for the user. An up-to-down or down-to-up direction in FIGS. 1-2 corresponds to a vertical direction of the image forming apparatuses 1, 101. Further, the right-to-left or left-to-right direction of the image forming apparatuses 1, 101 may be referred to as a widthwise direction, and the front-to-rear or rear-to-front direction may be referred to as a direction of depth. The widthwise direction and the direction of depth are orthogonal to each other. Therefore, for example, it may be recognized that an operation panel 33 is arranged on the front side, and a hinge 5 or hinge 105 is arranged on the rear side.

Furthermore, directions of the drawings in FIGS. 3-7 are similarly based on the orientation of the image forming apparatuses 1, 101 as defined above and correspond to those with respect to the image forming apparatuses 1, 101 shown in FIGS. 1-2 even when the drawings are viewed from different angles.

In FIGS. 3-11, it may be noted that image forming units 2, 102 and document reader units 3, 103 are represented in simplified rectangular forms in order to rather focus on configurations of retainers 4, 104.

[Overall Configuration of the Image Forming Apparatus]

First, an overall configuration of the image forming apparatus 1 according to the first embodiment of the present disclosure will be described below with reference to FIGS. 1-2. The image forming apparatus 1 may be a multifunction printer, capable of providing multiple functions. As shown in FIG. 1, the image forming apparatus 1 includes an image forming unit 2, a document reader unit 3 arranged in an upper position with respect to the image forming unit 2, and a retainer 4 (see FIG. 2) arranged between the image forming unit 2 and the document reader unit 3. The image forming unit 2 and the document reader unit 3 will be described below, and the retainer device 4 will be described later in detail.

The image forming unit 2 for forming images on sheets has an approximately box-shaped enclosure, which accommodates a body of image forming device (not shown), a feeder cassette (not shown), and a feeder device (not shown) to feed the sheets to the image forming device.

The image forming device may include a known configuration for forming images in a known image-forming method, which includes an electro-photographical printing, an inkjet-printing, and other printing methods. The feeder cassette and the feeder device may be in known configurations. Therefore, the present disclosure omits detailed description concerning the structures of the image forming device, the feeder cassette, and the feeder device.

The document reader unit 3 in the upper position with respect to the image forming unit 2 is movable to an open position, in which a front end of the document reader unit 3 is uplifted, as shown in FIG. 2. Meanwhile, in a position below the document reader unit 3, on an upper face of the image forming unit 2, formed is an ejection tray 21, which inclines downward to incline in curve to be lower at the rear side and higher at the front side. The image forming unit 2 may eject a sheet with an image formed thereon from the image forming device, from the rear side toward the front side, to place on the ejection tray 21.

The document reader unit 3 may be placed in a closed position, in which the document reader unit 3 is set to rest on the image forming unit 2, as shown in FIG. 1. With the document reader unit 3 in the closed position, a sheet-pickup opening 22 is formed in a position between an upper-front part of the image forming unit 2 and a lower face of the document reader unit 3.

When, for example, the document reader unit 3 is in the closed position, and if the sheet has a substantial length, such as an A4-sized (210 mm*297 mm) sheet, a front end of the sheet may reach an area in the vicinity of the sheet-pickup opening 22. Therefore, according to this structure, the user may insert his/her hand through the sheet-pickup opening 22 to pick up the ejected sheet from the ejection tray 21. This structure of the image forming apparatus 1 with the ejection tray 21, which may be accessed through the sheet-pickup opening 22 formed between the image forming unit 2 and the document reader unit 3, may be called as an "in-body ejection type."

The document reader unit 3 will be described below. The document reader unit 3 for reading an image from an original document may include a flatbed scanner, which may read the image from the original document placed on a document platen. The document reader unit 3 includes a casing 31, which is placed on top of the image forming unit 2 to cover an upper face of the ejection tray 21.

The casing 31 may have a shape of a top-open box, and an image sensor (not shown) may be disposed inside the casing 31. A top opening of the casing 31 may be covered by a platen glass (not shown), on which the original document may be placed. The image sensor may be a linear sensor, in which a plurality of photodiodes are arranged in line along the front-rear direction. The image sensor may be set on one side, e.g., a left-hand side, in the casing 31 and may be moved in the widthwise direction, e.g., rightward, by a driving device (not shown).

On top of the casing 31, arranged is a document cover 32, which covers the platen glass from above. The document cover 32 is supported pivotably by a hinge (not shown), which is arranged at a rear end of the casing 31. When the user pivotably moves a frontend of the document cover 32 upward or downward, the document cover 32 may be opened or closed with respect to the casing 31.

On a frontward area in the casing 31, arranged is the operation panel 33. On an upper-leftward side in the document cover 32, arranged is an auto-document feeder (ADF) unit 34. The operation panel 33 and the ADF unit 34 may be in known configurations; therefore, detailed description of those will be herein omitted.

With configuration described above, the document reader unit 3 may drive the ADF unit 34 to convey the sheets of original document one-by-one from a document feeder tray 34A through an upper area of the image sensor so that the images on the sheets may be read by the image sensor automatically.

Further, the document reader unit 3 may drive the image sensor to move in the widthwise direction to read an image from a sheet of original document while the sheet of original document is set on top of the platen glass.

The document reader unit 3 configured as above is supported by a hinge 5 (see FIG. 3), which is arranged in a position between an upper-rear end of the image forming unit 2 and a lower-rear end of the document reader unit 3, to be pivotable upward or downward. With this structure, the document reader unit 3 in the upper position with respect to the image forming unit 2 is enabled to move between the closed position and the open position.

[First Exemplary Configuration of the Retainer]

Next, configuration of the retainer 4 according to the first embodiment of the present disclosure will be described in detail with reference to FIGS. 2, 3, and 6.

The retainer 4, which may retain the document reader unit 3 in the open position, is arranged between the image forming unit 2 and the document reader unit 2, on each side along the widthwise direction, in a central area along the front-rear direction. The retainer 4 arranged on the right-hand side and the retainer 4 arranged on the left-hand side in the image forming apparatus 1 are substantially identical but symmetrical to each other. Therefore, in the following description, the retainer 4 on the left-hand side will be representatively explained, while description of the retainer 4 on the right-hand side will be omitted.

Figure 3:
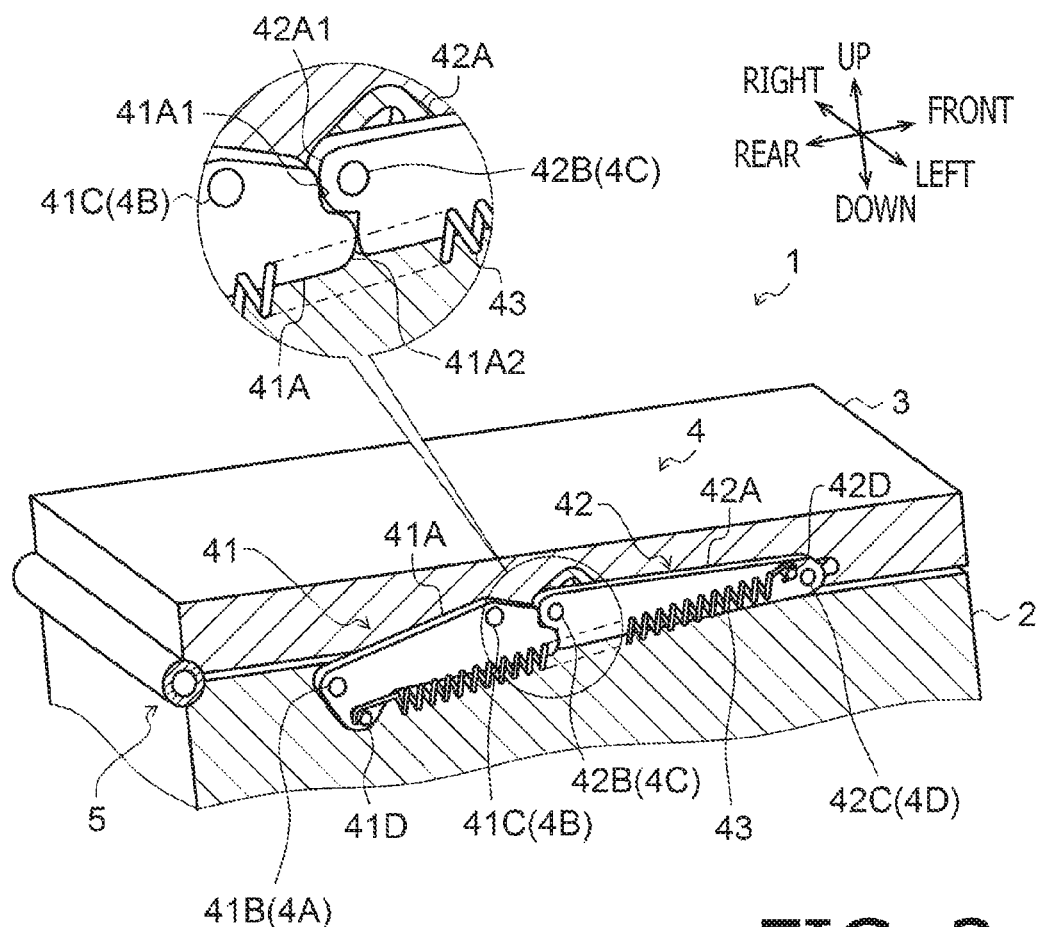
FIG. 3 is a perspective view and a partly enlarged view of a retainer, when the document reader unit is in the closed position, in the image forming apparatus according to the first embodiment of the present disclosure.

The retainer 4 includes, as shown in FIG. 3, a first link member 41, a second link member 42, and a tension coil spring 43.

The first link member 41 includes a link body 41A, a first rotation shaft 41B, a second rotation shaft 41C, and a first engageable part 41D. The link body 41A is formed in a shape of an elongated plate. The first rotation shaft 41B is arranged on one longitudinal end, e.g., a rearward end, of the link body 41A to extend axially orthogonally to the link body 41A. The second rotation shaft 41C is arranged on the other longitudinal end, e.g., a frontward end, of the link body 41A to extend axially in parallel with the first rotation shaft 41B. The first engageable part 41D is formed in proximity to the first rotation shaft 41B on the one end, e.g., the rearward end, of the link body 41A to protrude sideward, e.g., orthogonally to the link body 41A.

Figure 6:
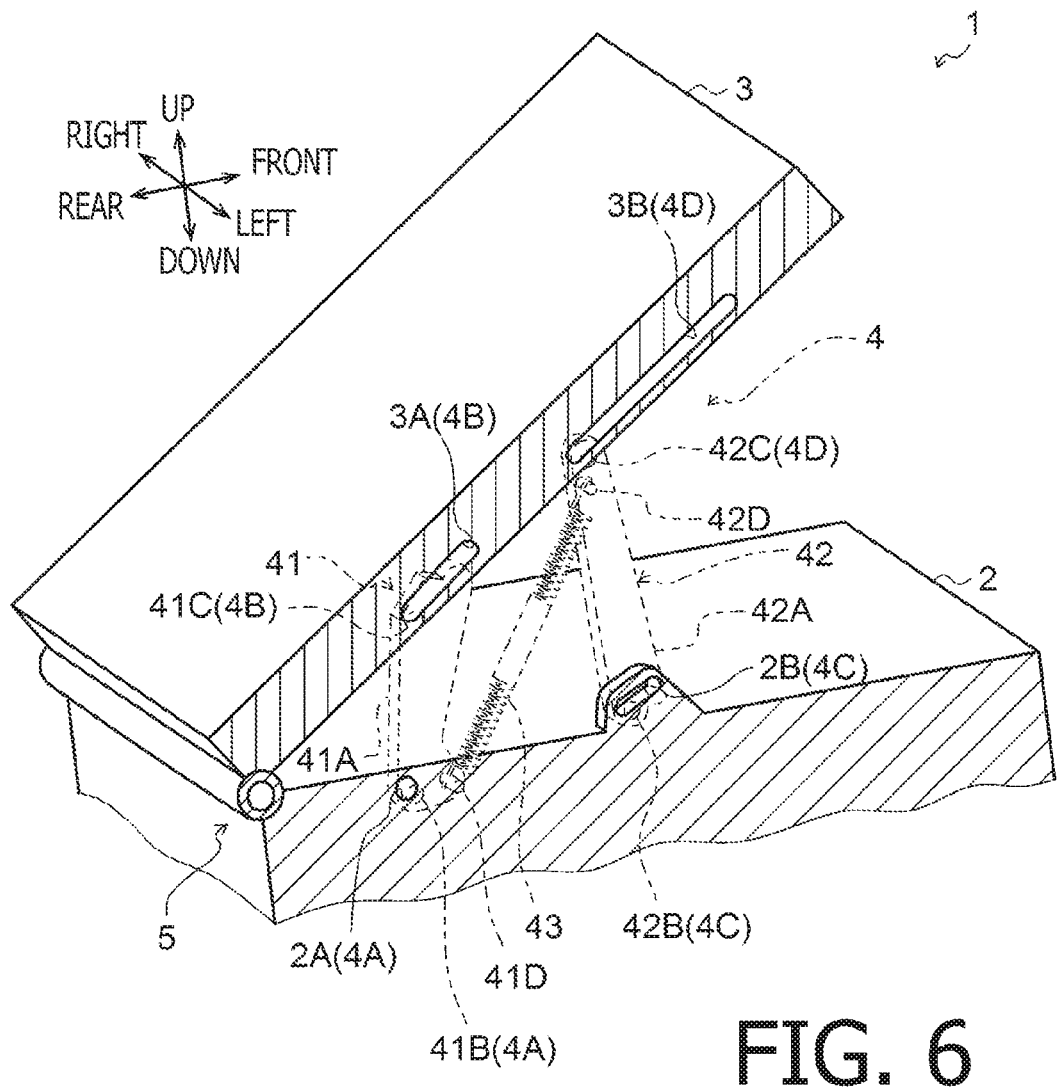
FIG. 6 is a perspective partial view of the image forming unit and the document reader unit to illustrate shapes of openings, which are coupled with the retainer, when the document reader unit is in the open position, in the image forming apparatus according to the first embodiment of the present disclosure.

Meanwhile, as shown in FIG. 6, in an upper position on a leftward face of the image forming unit 2, formed is a first hole 2A being a round hole. On the other hand, in a lower position on a leftward face of the document reader unit 3, formed is a second hole 3A being an elongated hole, which mates with the second rotation shaft 41C. The second hole 3A is formed in a frontward position with respect to the first hole 2A, when the document reader unit 3 is in the closed position, to be elongated along the front-rear direction.

The first link member 41 is, with the first rotation shaft 41B being rotatably inserted in the first hole 2A, coupled with the image forming unit 2 at the one end, e.g., the rear end, thereof. Further, the first link member 41 is, with the second rotation shaft 41C being inserted in the mating second hole 3A rotatably and movably in a direction orthogonal to the extending direction of the second rotation shaft 41C, coupled with the document reader unit 3 at the other end, e.g., the front end, thereof.

In other words, on the one end of the first link member 41, formed is a first coupling section 4A, which includes the first rotation shaft 41B and the first hole 2A, and through which the first link member 41 is coupled with the image forming unit 2. Further, on the other end of the first link member 41, formed is a second coupling section 4B, which includes the second rotation shaft 41C and the second hole 3A, and through which the first link member 41 is coupled with the document reader unit 3.

As shown in FIG. 3, when the document reader unit 3 is in the closed position, the first link member 41 is arranged to have the first coupling section 4A rearward, which is the side closer to the hinge 5, and the second coupling section 4B frontward, which is the side farther from the hinge 5, to extend in the front-rear direction.

Meanwhile, on a front end being the other end of the link body 41A, formed are a first contacting part 41A1 and a second contacting part 41A2. The first contacting part 41A1 may include a substantially straight edge, and the second contacting part 41A2 may be formed continuously to extend downward from the first contacting part 41A1. The first link member 41 may contact a second link member 42, which will be described later in detail, through the first contacting part 41A1 and the second contacting part 41A2.

Next, the second link member 42 will be described below. The second link member 42 includes a link body 42A, a third rotation shaft 42B, a fourth rotation shaft 42C, and a second engageable part 42D. The link body 42A is formed in a shape of an elongated plate. The third rotation shaft 42B is arranged on one longitudinal end, e.g., a rearward end, of the link body 42A to extend axially orthogonally to the link body 42A. The fourth rotation shaft 42C is arranged on the other longitudinal end, e.g., a frontward end, of the link body 42A to extend axially in parallel with the third rotation shaft 42B. The second engageable part 42D is formed in proximity to the fourth rotation shaft 42C on the other end, e.g., the frontward end, of the link body 42A to protrude sideward, e.g., orthogonally to the link body 42A.

Meanwhile, as shown in FIG. 6, in an upper position on the leftward face of the image forming unit 2, in a frontward position farther from the hinge 5 than the first hole 2A, formed is a third hole 2B being an elongated hole, which mates with the third rotation shaft 42B. On the other hand, in a lower position on the leftward face of the document reader unit 3, in a frontward position farther from the hinge than the second hole 3A, formed is a fourth hole 3B. The third hole 2B is elongated to incline to be lower at the rear side and higher at the front side. The fourth hole 3B is formed in a frontward position with respect to the third hole 2B, when the document reader unit 3 is in the closed position, to be elongated along the front-rear direction to mate with the fourth rotation shaft 42C.

The second link member 42 is, with the third rotation shaft 42B being inserted in the mating third hole 2B rotatably and movably in a direction orthogonal to the extending direction of the third rotation shaft 42B, coupled with the image forming unit 2 at the one end, e.g., the rear end, thereof. Further, the second link member 42 is, when the fourth rotation shaft 42C is inserted in the mating fourth hole 2B rotatably and movably in a direction orthogonal to the extending direction of the fourth rotation shaft 42C, coupled with the document reader unit 3 at the other end, e.g., the front end, thereof.

In other words, on the one end of the second link member 42, formed is a third coupling section 4C, which includes the third rotation shaft 42B and the third hole 2B, and through which the second link member 42 is coupled with the image forming unit 2. Further, on the other end of the second link member 42, formed is a fourth coupling section 4D, which includes the fourth rotation shaft 42C and the fourth hole 3B, and through which the second link member 42 is coupled with the document reader unit 3.

As shown in FIG. 3, when the document reader unit 3 is in the closed position, the second link member 42 is arranged to have the third coupling section 4C rearward, which is the side closer to the hinge 5, and the fourth coupling section 4D frontward, which is the side farther from the hinge 5, to extend in the front-rear direction.

As mentioned above, the third hole 2B being a part of the third coupling section 4C is formed to incline to be lower at the rear side. Therefore, for example, when the second link member 42 rotates about the third rotation shaft 42B in accordance with the pivot movement of the document reader unit 3, the third rotation shaft 42B may be guided to be lower, i.e., rearward, within the third hole 2B due to an effect of gravity by a weight of the second link member 42 thereof. With this guide, the second link member 42 may be rotated smoothly, and the document reader unit 3 may be moved to pivot stably.

Meanwhile, on a rear end being the one end of the link body 42A closer to the hinge 5, formed is a contact part 42A1. The link body 42A of the second link member 42 may contact the first contacting part 41A1 and the second contacting part 41A2 of the first link member 41 at the contacting part 42A1.

Next, the tension coil spring 43 to couple the first link member 41 and the second link member 42 with each other will be described below. The tension coil spring 43 is engaged with the first engageable part 41D, which is in the first coupling section 4A of the first link member 41, at one end, and with the second engageable part 42D, which is in the fourth coupling section 4D of the second link member 42, at the other end.

When the document reader unit 3 is in the closed position, the tension coil spring 43 is stretched in the front-rear direction between the first link member 41 and the second link member 42. Thereby, the first link member 41 and the second link member 42 are arranged to face each other along a tensile direction being a contracting direction of the tension coil spring 43 and are urged to tend to be closer to each other in the front-rear direction due to an urging force of the tension coil spring 43.

Therefore, while the first contacting part 41A of the first link member 41 and the contact part 42A1 of the second link member 42 are placed to contact each other, postures of the first link member 41 and the second link member 42 are maintained steady. Accordingly, while the document reader unit 3 is coupled with the image forming unit 2 through the retainer 4, a condition of the document reader unit 3 in the closed position may be steadily maintained.

The urging force from the tension coil spring 43, when the document reader unit 3 is in the closed position, may directly affect on the first link member 41 and the second link member 42 alone. Therefore, for example, when the document reader unit 3 is in the closed position, the urging force of the tension coil spring 43 may be constantly produced between the image forming unit 2 and the document reader unit 3.

In this regard, however, with the first link member 41 and the second link member 42 contacting each other, the urging force of the tension coil spring 43 may be borne by the first link member 41 and the second link member 42. Therefore, the document reader unit 3 in the closed position may be prevented from being affected by the urging force from the tension coil spring 43, and displacement of the document reader unit 3 with respect to the image forming unit 2 may be restrained.

The first engageable part 41D in the first link member 41 is, when the document reader unit 3 is in the closed position, in a lower position than the first rotation shaft 41B, which is a part of the first coupling section 4A. Further, the second engageable part 42D in the second link member 42 is, when the document reader unit 3 is in the closed position, in a rearward position with respect to the fourth rotation shaft 42B, which is a part of the fourth coupling section 4D. Therefore, the tension coil spring 43 is arranged between the first engageable part 41D and the second engageable part 42D to incline upper-frontward.

With this arrangement, as long as the document reader unit 3 is in the closed position, the first engageable part 41D in the first link member 41 is urged constantly by the tension coil spring 43 upper-frontward, i.e., in a direction to move the document reader unit 3 to pivot about the first rotation shaft 41B toward the open position. Accordingly, when, for example, the user moves the document reader unit 3 to pivot from the closed position toward the open position even for a small amount, the first link member 41 may be urged by the tension coil spring 43 to pivot the document reader unit 3 about the first rotation shaft 41B in the first coupling section 4A. In other words, the document reader unit 3 may be easily moved to pivot from the closed position to the open position.

Meanwhile, the third rotation shaft 42B in the second link member 42 is, when the document reader unit 3 is in the closed position, in an upper position with respect to the tension coil spring 43. With this arrangement, as long as the document reader unit 3 is in the closed position, the second engageable part 42D in the second link member 42 is urged constantly by the tension coil spring 43 lower-rearward, i.e., in a direction to move the document reader unit 3 to pivot about third rotation shaft 42B toward the closed position. Accordingly the condition of the document reader unit 3 being in the closed position may be maintained steadily.

As described above, in the retainer 4 according to the present embodiment, the first coupling section 4A in the first link member 41 may be configured with the first rotation shaft 41B and the first hole 2A being a round hole. Meanwhile, the second coupling section 4B in the first link member 41, the third coupling section 4C in the second link member 42, and the fourth coupling section 4D in the second link member 42 may be configured with the second rotation shaft 41C and the second hole 2B, the third rotation shaft 42B and the third hole 3A, and the fourth rotation shaft 41C and the fourth hole 3B, respectively, wherein the second hole 2B, the third hole 3A, and the fourth hole 3B are elongated holes. In other words, solely the first coupling section 4A may include the round hole, and the second, third, and fourth coupling sections 4B, 4C, 4D include the elongated holes.

However, the configurations of the first, second, third, and fourth coupling sections 4A, 4B, 4C, 4D may not necessarily be limited to those described above as long as one of the first, second, third, and fourth coupling sections 4A, 4B, 4C, 4D is configured to have a rotation shaft and a round hole, in which the rotation shaft is inserted rotatably.

[Behaviors of the Retainer 4]

Next, a flow of behaviors of the retainer 4 according to the present embodiment will be described with reference to FIGS. 3-7.

In a condition for the user to ordinarily use the image forming apparatus 1, the document reader unit 3 may be in the closed position, as shown in FIG. 3. When the document reader unit 3 is in the closed position, the first link member 41 and the second link member 42 are arranged to be extended in the front-rear direction.

Meanwhile, the tension coil spring 43 is placed in a condition to be stretched at a largest extend between the first engageable part 41D in the first link member 41 and the second engageable part 42D in the second link member 42. In other words, the tension coil spring 43 applies a largest intensity of the urging force to the first link member 41 and the second link member 42.

In this regard, the first link member 41 and the second link member 42 are urged by the tension coil spring 43 to be closer to each other and contact each other at the first contacting part 41A1 and the contact part 42A1 respectively.

In order to move the document reader unit 3 in this condition in the closed position to the open position, the user may uplift the front part of the document reader unit 3 to pivot the document reader unit 3 upward through the hinge 5.

As the document reader unit 3 pivots upward, the first link member 41 follows the pivot movement of the document reader unit 3 and rotates about the first rotation shaft 41B upward in a counterclockwise direction. As the first link member 41 rotates, the first link member 41 uplifts the contact part 42A1 in the second link member 42 through the second contacting part 41A2. Further, the second rotation shaft 41C follows the pivot movement of the first link member 41 and moves in the second hole 3A in the document reader unit 3 rearward (see FIG. 6).

Meanwhile, the second link member 42 follows the pivot movement of the document reader unit 3 and rotates about the third rotation shaft 42B upward in the counterclockwise direction. In this regard, the second link member 42 is urged rearward, i.e., toward the side of the first link member 41, by the tension coil spring 43.

The second contacting part 41A2 may include a first cam edge being a round projection formed on one of longitudinal ends of the first link member 41 along the front-rear direction, e.g., on a front side, which is a side closer to the second link member 42. On the other hand, the contact part 42A1 may include a second cam edge being a round projection formed on one of longitudinal ends of the second link member 42 along the front-rear direction, e.g., on a rear side, which is a side closer to the first link member 41.

In this regard, a length L1 (see FIG. 7A) being a longitudinal dimension of the third hole 2B (see FIG. 6) in the front-rear direction is larger than a length L2 (see FIG. 7B), which is a travel distance for the third rotation shaft 42B of the second link member 42 inserted in the third hole 2B to move when the second contacting part 41A2 climbs over the contact part 42A1 being the second cam edge (i.e., L1>L2).

For example, when the document reader unit 3 is in the closed position, as shown in FIG. 7A, the third rotation shaft 42B of the second link member 42 may be at a rear end of the third hole 2B. Starting from this position, when the document reader unit 3 moves to pivot toward the open position, the first link member 41 may follow the pivot movement of the document reader unit 3 to rotate, and the second contacting part 41A2 of the first link member 41 may push the contact part 42A1 of the second link 42 frontward. Thus, the third rotation shaft 42B being pushed by the first link member 41 may slide frontward within the third hole 2B.

When the contact part 42A1 is pushed by the second contacting part 41A2 to a farthest frontward extent, as shown in FIG. 7B, the third rotation shaft 42B is located at position, which is apart from a front end of the third hole 2B, without contacting the front end of the third hole 2B. In other words, the length L1 of the third hole 2B is longer than the travel distance L2 of the third rotation shaft 42B.

Thereafter, when the second contacting part 41A2 climbs over the contact part 42A and moves upward, the contact part 42A1 in the second link member 42 may be disengaged from the second contact part 41A2, and the second link member 42 released from the push may turn to move rearward again by the weight thereof due to the effect of gravity. Therefore, as shown in FIG. 7C, the third rotation shaft 42B may slide rearward to the rearmost position in the third hole 2B.

Thus, the contact part 42A1 in the second link member 42 may be pushed upper-frontward against the urging force of the tension coil spring 43 by the contact with the second contacting part 41A2 of the first link member 41. In this regard, the first link member 41 and the second link member 42 may move smoothly along the first cam edge in the first contacting part 41A2 of the first link member 41 and the second cam edge in the contact part 42A1 in the second link member 42. Accordingly, the third rotation shaft 42B may follow the pivot movement of the second link member 42 and move frontward in the third hole 2B in the image forming unit 2.

Meanwhile, the second rotation shaft 42C may follow the pivot movement of the second link member 42 and move frontward in the fourth hole 3B (see FIG. 6) in the document reader unit 3.

When the document reader unit 3 reaches a predetermined position between the closed position and the open position, the second contacting part 41A2 of the first link member 41 having climbed over the contact part 42A1 of the second link member 42 is released from the contact with the contact part 42A1 of the second link member 42.

Figure 4:
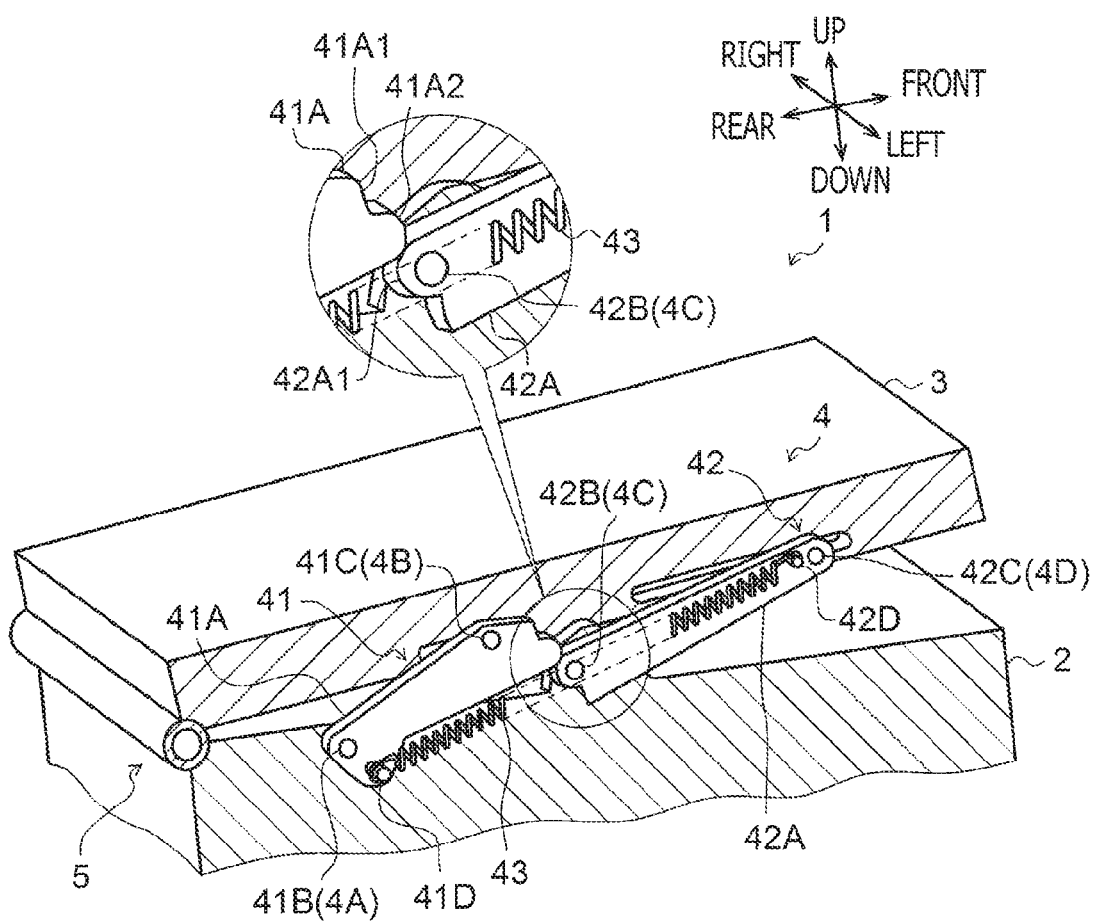
FIG. 4 is a perspective view and a partly enlarged view of the retainer, when the document reader unit is in proximity to the closed position, in the image forming apparatus according to the first embodiment of the present disclosure.

More specifically, as shown in FIG. 4, while the first link member 41 and the second link member 42 extend upper-frontward, the second contacting part 41A2 climbed over the contact part 42A1 may be in a posture to contact an upper area of the contact part 42A1.

In the meantime, the second link member 42 is continuously urged rearward, i.e., toward the side of the first link member 41, by the tension coil spring 43. Further, while the third hole 2B in the image forming unit 2 is formed to incline to be lower toward the side of the hinge 5, i.e., rearward, the third rotation shaft 42B is maintained at the rear end of the third hole 2B due to the effect of the gravity.

In this condition, for example, due to the weight of the document reader unit 3 and/or external load applied to the document reader unit 3, the document reader unit 3 may tend to move downward to return to the closed position. However, due to the condition described above, the postures of the first link member 41 and the second link member 42 may be maintained unless the second contacting part 41A2 descends downward beyond the contact part 42A1 against the urging force of the tension coil spring 43. In other words, the posture of the document reader unit 3 may tend to be maintained.

When the document reader unit 3 is moved to pivot further beyond the predetermined position toward the open position, the first link member 41 may follow the pivot movement of the document reader unit 3 and rotate about the first rotation shaft 41B upward in the counterclockwise direction. The second rotation shaft 41C may follow the rotating movement of the first link member 41 and move further rearward in the second hole 3A in the document reader unit 3.

Meanwhile, the second link member 42 may follow the pivot movement of the document reader unit 3 to further rotate about the third rotation shaft 42B upward in the counterclockwise direction. In this regard, while the second link member 42 is continuously urged rearward, i.e., toward the side of the first link member 41, a stretched amount of the tension coil spring 43 is reduced to be smaller, and the urging force to be applied to the first link member 41 and the second link member 42 may be reduced.

The third rotation shaft 42B at the rear end of the third hole 2B in the image forming unit 2 may follow the rotating movement of the second link member 42 and rotate about an axis thereof. On the other hand, the fourth rotation shaft 42C in the fourth hole 3B (see FIG. 6) in the document reader unit 3 may follow the rotating movement of the second link member 42 and move rearward in the fourth hole 3B.

Figure 5:
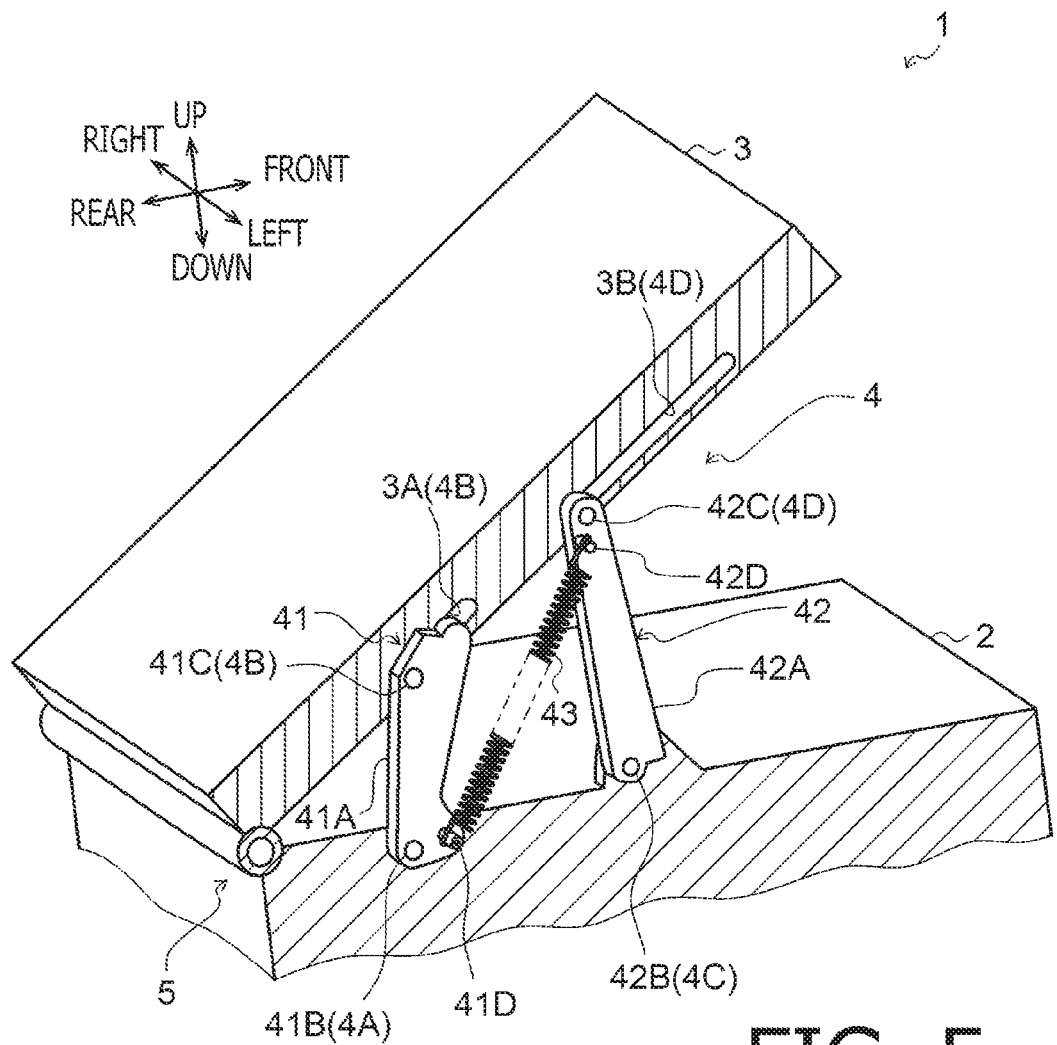
FIG. 5 is a perspective view of the retainer, when the document reader unit is in the open position, in the image forming apparatus according to the first embodiment of the present disclosure.

Thereafter, when the document reader unit 3 reaches the open position, as shown in FIG. 5, the first link member 41 and the second link member 42 are maintained at vertically extending postures. In the first link member 41 in this posture, the first engageable part 41D is placed in a frontward position with respect to the first rotation shaft 41B. In the second link member 42 in this posture, the second engageable part 42D is placed in an upper-frontward position with respect to the first engageable part 41D. Therefore, the first link member 41 is urged upper-frontward at the first engageable part 41D.

Accordingly, the first link member 41 is urged by the tension coil spring 43 to tend toward rotating about the first rotation shaft 41B in the counterclockwise direction, which is the direction to move the document reader unit 3 toward the open position. Thus, the posture of the document reader unit 3 may be maintained.

According to the flow of the behaviors described above, the document reader unit 3 may be moved from the closed position to the open position.

Next, a flow of behaviors of the first and second link members 41, 42 when the document reader unit 3 in the open position is moved to the closed position will be described below. When the document reader unit 3 in the open position is moved to the closed position, the first and second link members 41, 42 behave in a reversed order from the flow of behaviors when the document reader unit 3 in the closed position is moved to the open position described above. In other words, the frontward part of the document reader unit 3 may be pushed downward to pivot the document reader unit 3 downward through the hinge 5.

As the document reader unit 3 pivots downward, the first link member 41 may follow the pivot movement and rotate about the first rotation shaft 41B downward in a clockwise direction. The second rotation shaft 41C in the second hole 3A in the document reader unit 3 may follow the rotating movement of the first link member 41 and move frontward in the second hole 3A.

Meanwhile, the second link member 42 may follow the pivot movement of the document reader unit 3 and rotate about the third rotation shaft 42B downward in the clockwise direction. In this regard, while the second link member 42 is continuously urged rearward, i.e., toward the side of the first link member 41, a stretched amount of the tension coil spring 43 is increased to be larger, and the urging force to be applied to the first link member 41 and the second link member 42 may increase.

The third rotation shaft 42B at the rear end of the third hole 2B in the image forming unit 2 may follow the rotating movement of the second link member 42 and rotate about the axis thereof. On the other hand, the fourth rotation shaft 42C in the fourth hole 3B in the document reader unit 3 may follow the rotating movement of the second link member 42 and move frontward in the fourth hole 3B.

When the document reader unit 3 reaches the predetermined position between the closed position and the open position, the second contacting part 41A2 of the first link member 41 is lowered to contact the upper area of the contact part 42A of the second link member 42.

More specifically, as shown in FIG. 4, while the first link member 41 and the second link member 42 are maintained to extend upper-frontward, the second contacting part 41A2 is placed to contact the upper area of the contact part 42A1. In the meantime, the second link member 42 is continuously urged rearward, i.e., toward the side of the first link member 41, by the tension coil spring 43. Accordingly, the document reader unit 3 may tend to be maintained at the predetermined position between the closed position and the open position.

In other words, the first link member 41 has the second contacting part 41A2, which contacts the contact part 42A1 of the second link member 42 at an intermediate position between the open position and the closed position. Therefore, with the second contacting part 41A2 contacting the upper area of the contact part 42A1, the postures of the first link member 41 and the second link member 42 are maintained, and the document reader unit 3 may be maintained at the predetermined position.

In this regard, for example, when the document reader unit 3 is moved to pivot from the open position to the closed position, at the point of the contact between the second contacting part 41A2 of the first link member 41 and the second link member 42, a speed of the pivot movement may be reduced due to the contact. Therefore, the document reader unit 3 may be restrained from being moved too rapidly or roughly to the closed position. Thus, the user may recognize a position of the document reader unit 3, which is about to reach the closed position, and may close the document reader unit 3 carefully or moderately from the point of contact.

Further, impact, which may be caused by the rapid closing motion, may be absorbed by the contact between the second contacting part 41A2 and the contact part 42A1. Accordingly, the document reader unit 3 may be prevented from being damaged, and durability of the image forming apparatus 1 may be improved.

When the document reader unit 3 is moved further beyond the predetermined position toward the closed position, the first link member 41 follows the pivot movement of the document reader unit 3 and rotate about the first rotation shaft 41B further downward in the clockwise direction. In this regard, the first link member 41 presses the contact part 42A1 of the second link member 42 downward through the second contacting part 41A2.

Meanwhile, the second rotating shaft 41C in the second hole 3A in the document reader unit 3 follows the rotating movement of the first link member 41 and moves frontward in the second hole 3A.

On the other hand, the second link member 42 follows the rotating movement of the document reader unit 3 and rotates about the third rotation shaft 42B downward in the clockwise direction. In this regard, the second link member 42 is urged by the tension coil spring 43 rearward, i.e., toward the side of the first link member 41.

Therefore, the contact part 42A1 of the second link member 42 is pushed lower-frontward by the second contacting part 41A2 of the first link member 41 against the urging force of the tension coil spring 43.

Accordingly, the third rotation shaft 42B in the third hole 2B in the image forming unit 2 may follow the rotating movement of the second link member 42 and move frontward in the third hole 2B. Further, the fourth rotation shaft 42C in the fourth hole 3B (see FIG. 6) in the document reader unit 3 may follow the rotating movement of the second link member 42 and move frontward in the fourth hole 3B.

When the document reader unit 3 reaches the closed position, as shown in FIG. 3, the second contacting part 41A2 of the first link member 41 may descend downward beyond the contact part 42A1 of the second link member 42 to be located in the lower position with respect to the contact part 42A1.

More specifically, the first contacting part 41A1 of the first link member 41 contacts the contact part 42A1 of the second link member 42, and the first link member 41 and the second link member 42 are maintained in the postures extended in the front-rear direction.

The document reader unit 3 may thus be moved from the open position to the closed position. According to the embodiment described above, the image forming apparatus 1 may retain the postures of the document reader unit 3 steadily while displacement of the document reader unit 3 from the image forming unit 2 by the urging force of the tension coil spring 43 may be restrained.

[Second Exemplary Configuration of the Retainer]

Next, a retainer 104 according to a second embodiment of the present disclosure will be described with reference to FIGS. 8 and 11. The retainer 104 in the second embodiment in an image forming apparatus 101 is in a configuration similar to the retainer 4 in the previous embodiment but differs from the retainer 4 in having an eighth coupling section 104D in a fourth link member 142 and a different contacting structure between a third link member 141 and a fourth link member 142 from the contacting structure between the first link member 41 and the second link member 42 described above. In the following description, explanation of items and structures in the retainer 104 which are identical or equivalent to those described with regard to the retainer 4 in the previous embodiment will be omitted.

The retainer 104 is arranged in a position between an image forming unit 102 and a document reader unit 103, on each side along the widthwise direction, in a central area with along the front-rear direction. The retainer 104 arranged on the right-hand side and the retainer 104 arranged on the left-hand side in the image forming apparatus 101 are substantially identical but symmetrical to each other. Therefore, in the following description, the retainer 104 on the left-hand side will be representatively explained, while description of the retainer 104 on the right-hand side will be omitted.

The retainer 104 includes, as shown in FIG. 8, the third link member 141, the fourth link member 142, and a tension coil spring 143.

The third link member 141 includes a link body 141A, a fifth rotation shaft 141B, a sixth rotation shaft 141C, and a third engageable part 141D. The link body 141A is formed in a shape of an elongated plate. The fifth rotation shaft 141B is arranged on one longitudinal end, e.g., a rearward end, of the link body 141A to extend axially orthogonally to the link body 141A. The sixth rotation shaft 141C is arranged on the other longitudinal end, e.g., a frontward end, of the link body 141A to extend axially in parallel with the fifth rotation shaft 141B. The third engageable part 141D is formed in proximity to the fifth rotation shaft 141B on the one longitudinal end, e.g., the rearward end, of the link body 141A to protrude sideward, e.g., orthogonally to the link body 141A.

Meanwhile, as shown in FIG. 11, in an upper position on a leftward face of the image forming unit 102, formed is a fifth hole 102A being a round hole. On the other hand, in a lower position on a leftward face of the document reader unit 103, formed is a sixth hole 103A being an elongated hole mating with the sixth rotation shaft 141C. The sixth hole 103A is, when the document reader unit 103 is in the closed position, formed in a frontward position with respect to the fifth hole 102A to be elongated along the front-rear direction.

The third link member 141 is, with the fifth rotation shaft 141B being rotatably inserted in the fifth hole 102A, coupled with the image forming unit 102 at the one end, e.g., the rear end, thereof. Further, the third link member 141 is, with the sixth rotation shaft 141C being inserted in the mating sixth hole 103A rotatably and movably in a direction orthogonal to the extending direction of the sixth rotation shaft 141C, coupled with the document reader unit 103 at the other end, e.g., the front end, thereof.

In other words, on the one end of the third link member 141, formed is a fifth coupling section 104A, which includes the fifth rotation shaft 141B and the fifth hole 102A, and through which the third link member 141 is coupled with the image forming unit 102. Further, on the other end of the fourth link member 142, formed is a sixth coupling section 104D, which includes the sixth rotation shaft 141C and the sixth hole 103A, and through which the third link member 141 is coupled with the document reader unit 103.

On the other end of the fourth link member 142, further, formed is a sixth coupling section 104B, which includes the sixth rotation shaft 141C and the sixth hole 103A, and through which the third link member 141 is coupled with the document reader unit 103.

As shown in FIG. 8, when the document reader unit 103 is in the closed position, the third link member 141 is arranged to have the fifth coupling section 104A rearward, which is the side closer to the hinge 105, and the sixth coupling section 104B frontward, which is the side farther from the hinge 105, to extend in the front-rear direction.

In the link body 141A, further, in an intermediate position along the extending direction, formed is a projection 141E, through which the link body 141A may contact the fourth link member 142. The contacting structure between the projection 141E and the link body 141A will be described later in detail.

Next, the fourth link member 142 will be described below. The fourth link member 142 includes a link body 142A, a seventh rotation shaft 142B, an eighth rotation shaft 142C, and a fourth engageable part 142D. The link body 142A is formed in a shape of an elongated plate. The seventh rotation shaft 142B is arranged on one longitudinal end, e.g., a frontward end, of the link body 142A to extend axially orthogonally to the link body 142A. The eighth rotation shaft 142C is arranged on the other longitudinal end, e.g., a rearward end, of the link body 142A to extend axially in parallel with the seventh rotation shaft 142B. The fourth engageable part 142D is formed in proximity to the seventh rotation shaft 142B on the one longitudinal end, e.g., the frontward end, of the link body 142A to protrude sideward, e.g., orthogonally to the link body 142A.

Meanwhile, as shown in FIG. 11, in an upper position on the leftward face of the image forming unit 102, in a frontward position farther from the hinge 105 than the fifth hole 102A, formed is a seventh hole 102B, which mates with the seventh rotation shaft 142B. In the third link member 141, further, in an intermediate position along the extending direction of the link body 141A, formed is an eighth hole 141F, which mates with the eighth rotation shaft 142C.

The fourth link member 142 is, with the seventh rotation shaft 142B being inserted in the mating seventh hole 102B rotatably and movably in a direction orthogonal to the extending direction of the seventh rotation shaft 142B, coupled with the image forming unit 102 through the one end thereof at a position farther from the hinge 105 than the third link member 141, e.g., a front ward position.

The fourth link member 142 is, further, with the eighth rotation shaft 142C being inserted in the mating eighth hole 141F rotatably and movably in a direction orthogonal to the extending direction of the eighth rotation shaft 142C, coupled with the third link member 141 through the other end thereof.

In other words, on the one end of the fourth link member 142, formed is a seventh coupling section 104C, which includes the seventh rotation shaft 142B and the seventh hole 102B, and through which the fourth link member 142 is coupled with the image forming unit 102.

Further, on the other end of the fourth link member 142, formed is an eighth coupling section 142C, which includes the eighth rotation shaft 142C and the eighth hole 141F, and through which the fourth link member 142 is coupled with the third link member 141.

As shown in FIG. 8, when the document reader unit 103 is in the closed position, the fourth link member 142 is arranged to have the seventh coupling section 104C frontward, which is the side farther from the hinge 105, and the eighth coupling section 142C rearward, which is the side closer to the hinge 105, to extend in the front-rear direction.

In the meantime, the link body 142A of the fourth link member 142 is formed to have a protrusive portion 142E in a middle area along a longitudinally extending direction of the link body 142A. The protrusive portion 142E includes a third contacting part 142E1, which includes a substantially straight edge formed on a side closer to the third link member 141, e.g., a rearward side, and a fourth contacting part 142E2, which is formed in an upper position with respect to the third contacting part 142E1 continuously from the third contacting part 142E1. Through the third contacting part 142E1 and the fourth contacting part 142E2, the fourth link member 142 may contact the third link member 141.

Next, the tension coil spring 143 will be described below. The tension coil spring 143 is engaged with the third engageable part 141D, which is formed in the third link member 141 on the side of the fifth coupling section 104A, at one end, and with the fourth engageable part 142D, which is formed in the fourth link member 142 on the side of the seventh coupling section 104C, at the other end.

When the document reader unit 103 is in the closed position, the tension coil spring 143 is stretched in the front-rear direction between the third link member 141 and the fourth link member 142. Thereby, the third link member 141 and the fourth link member 142 are arranged to align in a tensile direction being a contracting direction of the tension coil spring 43 and are urged to tend to be closer to each other in the front-rear direction due to an urging force of the tension coil spring 143.

Therefore, while the projection 141E in the third link member 141 and the protrusive portion 142E in the fourth link member 142 are placed to contact each other, postures of the third link member 141 and the fourth link member 142 are maintained steady. Accordingly, while the document reader unit 103 is coupled with the image forming unit 102 through the retainer 104, a condition of the document reader unit 103 in the closed position may be steadily maintained.

The urging force from the tension coil spring 143, when the document reader unit 103 is in the closed position, may directly affect on the third link member 141 and the fourth link member 142 alone. Therefore, for example, when the document reader unit 103 is in the closed position, the urging force of the tension coil spring 143 may be constantly produced between the image forming unit 102 and the document reader unit 103.

In this regard, however, with the third link member 141 and the fourth link member 142 contacting each other, the urging force of the tension coil spring 143 may be borne by the third link member 141 and the fourth link member 142. Therefore, the document reader unit 103 in the closed position may be prevented from being affected by the urging force from the tension coil spring 143, and displacement of the document reader unit 103 with respect to the image forming unit 102 may be restrained.

As described above, in the retainer 104 according to the present embodiment, the fifth coupling section 104A in the third link member 141 may be configured with the fifth rotation shaft 141B and the fifth hole 102A being a round hole. Meanwhile, The sixth coupling section 104B in the third link member 141, the seventh coupling section 104C in the fourth link member 142, and the eighth coupling section 104D in the fourth link member 142 may be configured with the sixth rotation shaft 141C and the sixth hole 102B, the seventh rotation shaft 142B and the seventh hole 103A, and the eighth rotation shaft 141C and the eighth hole 103B, respectively, wherein the sixth hole 102B, the seventh hole 103A, and the eighth hole 103B are elongated holes. In other words, solely the fifth coupling section 104A may include the round hole, and the sixth, seventh, and eighth coupling sections 104B, 104C, 104D include the elongated holes.

However, the configurations of the fifth, sixth, seventh, and eighth coupling sections 104A, 104B, 104C, 104D may not necessarily be limited to those described above as long as one of the fifth, sixth, seventh, and eighth coupling sections 104A, 104B, 104C, 104D is configured to have a rotation shaft and a round hole, in which the rotation shaft is inserted rotatably.

[Behaviors of the Retainer 104]

Next, a flow of behaviors of the retainer 104 according to the present embodiment will be described with reference to FIGS. 8-11. The flow of behaviors may be similar to that of the retainer 4 described above except for behaviors of the fourth link member 142. Therefore, in the following description, differences from the behaviors of the retainer 4 will be described, and description of the similar or the same behaviors may be omitted.

In a condition for the user to ordinarily use the image forming apparatus 101, the document reader unit 103 may be in the closed position, as shown in FIG. 8. When the document reader unit 103 is in the closed position, the third link member 141 and the fourth link member 142 are arranged to be extended in the front-rear direction.

Meanwhile, the third link member 141 and the fourth link member 142 are urged by the tension coil spring 143 to be closer to each other and contact each other through the projection 141E and the protrusive portion 142E respectively.

More specifically, when the document reader unit 103 is in the closed position, the projection 141E in the third link member 141 contacts the third contacting part 142E1 in the protrusive portion 142E of the fourth link member 142.

In order to move the document reader unit 103 in this condition in the closed position to the open position, the user may uplift a front part of the document reader unit 103 to pivot the document reader unit 103 upward through the hinge 105.

As the document reader unit 103 pivots upward, the third link member 141 follows the pivot movement of the document reader unit 103 and rotates about the fifth rotation shaft 141B upward in the counterclockwise direction. As the third link member 141 rotates, the third link member 141 uplifts the fourth contacting part 142E2 in the fourth link member 142 through the projection 141E.

Meanwhile, the fourth link member 142 follows the pivot movement of the document reader unit 103 and rotates about the seventh rotation shaft 142B upward in the clockwise direction. In this regard, the fourth link member 142 is continuously urged by the tension coil spring 143 rearward, i.e., toward the side of the third link member 141.

Thus, the fourth contact part 142E2 in the fourth link member 142 may be pushed upper-frontward by the projection 141E in the second link member 141 against the urging force of the tension coil spring 143. Accordingly, the seventh rotation shaft 142B may follow the rotating movement of the fourth link member 142 and move rearward in the seventh hole 102B in the image forming apparatus 102.

Meanwhile, the eighth rotation shaft 142C may follow the rotating movement of the fourth link member 142 and move frontward in the eighth hole 141F in the third link member 141.

When the document reader unit 103 reaches a predetermined position between the closed position and the open position, the projection 141E in the third link member 141 having climbed over the fourth contacting part 142E2 in the protrusive portion 142E of the fourth link member 142 is released from the contact with the third link member 141.

More specifically, as shown in FIG. 9, while the projection 141E climbs on the fourth contacting part 142E, the third link member 141 and the fourth link member 142 are in postures to extend obliquely in directions to intersect with each other.

In the meantime, the second link member 42 is continuously urged rearward, i.e., toward the side of the third link member 141, by the tension coil spring 143.

In this condition, for example, due to the weight of the document reader unit 103 and/or external load applied to the document reader unit 103, the document reader unit 103 may tend to move downward to return to the closed position. However, due to the condition described above, the postures of the third link member 141 and the fourth link member 142 may be maintained unless the projection 141E descends downward beyond the protrusive portion 142E in the fourth contacting part 142E2 against the urging force of the tension coil spring 143. In other words, the posture of the document reader unit 103 may tend to be maintained.

When the document reader unit 103 is moved to pivot further beyond the predetermined position toward the open position, the third link member 141 may follow the pivot movement of the document reader unit 103 and rotate about the fifth rotation shaft 141B upward in the counterclockwise direction.

Meanwhile, the fourth link member 142 may follow the pivot movement of the document reader unit 103 to further rotate about the seventh rotation shaft 142B upward in the clockwise direction. In this regard, the seventh rotation shaft 142B may follow the rotation of the third link member 141 and move rearward in the seventh hole 102B in the image forming unit 102.

Further, the eighth rotation shaft 142C may follow the rotating movement of the third link member 141 and move rearward in the eighth hole 141F in third link member 141.

Thereafter, when the document reader unit 103 reaches the open position, as shown in FIG. 10, the third link member 141 is maintained at a vertically extending posture, and the fourth link member 142 is maintained at a posture to extend upper-rearward to intersect with the third link member 141.

With the flow of the behaviors described above, the document reader unit 103 may be moved from the closed position to the open position.

Next, a flow of behaviors of the third and fourth link members 141, 142 when the document reader unit 103 in the open position is moved to the closed position will be described below. When the document reader unit 103 in the open position is moved to the closed position, the frontward part of the document reader unit 103 may be pushed downward to pivot the document reader unit 103 downward through the hinge 105.

As the document reader unit 103 pivots downward, the third link member 141 may follow the pivot movement and rotate about the fifth rotation shaft 141B downward in the clockwise direction.

Meanwhile, the second link member 142 may follow the pivot movement of the document reader unit 103 and rotate about the seventh rotation shaft 142B downward in the counterclockwise direction. In this regard, the seventh rotation shaft 142B in the seventh hole 102B in the image forming unit 102 may follow the rotating movement of the third link member 141 and move frontward in the seventh hole 103B. Further, the eighth rotation shaft 142C in the eighth hole 141F may follow the rotation of the third link member 141 and move frontward in the eighth hole 141F.

When the document reader unit 103 reaches the predetermined position between the closed position and the open position, the projection 141E in the third link member 141 is placed to contact the upper area of the protrusive portion 142E in the fourth link member 142.

More specifically, as shown in FIG. 9, with the projection 141E placed on the fourth contacting part 142E2 in the protrusive portion 142E, the third link member 141 and the fourth link member 142 are maintained in the postures to extend obliquely in the directions to intersect with each other.

In the meantime, the fourth link member 142 is continuously urged rearward, i.e., toward the side of the third link member 141, by the tension coil spring 143.

In this condition, the document reader unit 103 may be maintained in the predetermined position between the closed position and the open position. In other words, the fourth link member 142 has the fourth contacting part 141A2, which may contact the projection 141E in the third link member 141 at an intermediate position between the open position and the closed position. Therefore, with the projection 141E contacting the upper area of the fourth contacting part 142E, the postures of the third link member 141 and the fourth link member 142 are maintained, and the document reader unit 103 may be maintained at the predetermined position.

In this regard, for example, when the document reader unit 3 is moved to pivot from the open position to the closed position, at the point of the contact between the projection 141E in the third link member 141 and the fourth contacting part 142E2 in the second link member 42, a speed of the pivot movement may be reduced due to the contact. Therefore, the document reader unit 103 may be restrained from being moved too rapidly or roughly to the closed position. Thus, the user may recognize a position of the document reader unit 103, which is about to reach the closed position, and may close the document reader unit 103 carefully or moderately from the point of contact.

Further, impact, which may be caused by the rapid closing motion, may be absorbed by the contact between the projection 141E in the third link member 141 and the fourth contacting part 142E2 in the second link member 42. Accordingly, the document reader unit 103 may be prevented from being damaged, and durability of the image forming apparatus 101 may be improved.

When the document reader unit 103 is moved further beyond the predetermined position toward the closed position, the third link member 141 follows the pivot movement of the document reader unit 103 and rotate about the fifth rotation shaft 141B further downward in the clockwise direction. In this regard, the third link member 141 presses the fourth contacting part 142E2 of the fourth link member 142 downward through the projection 141E.

Meanwhile, the fourth link member 142 follows the pivot movement of the document reader unit 103 and rotates about the seventh rotation shaft 142B downward in the clockwise direction. In this regard, the fourth link member 142 is continuously urged by the tension coil spring 143 rearward, i.e., toward the side of the third link member 141.

Therefore, the fourth link member 142 is pushed lower-frontward by the projection 141E of the third link member 141 through the fourth contacting part 142E2 against the urging force of the tension coil spring 43.

Accordingly, the seventh rotation shaft 142B in the seventh hole 102B in the image forming unit 102 may follow the rotating movement of the fourth link member 142 and move frontward in the seventh hole 102B. Further, the eighth rotation shaft 142C in the eighth hole 141F in the document reader unit 103 may follow the rotating movement of the fourth link member 142 and move frontward in the eighth hole 141F.

When the document reader unit 103 reaches the closed position, as shown in FIG. 8, the projection 141E of the third link member 141 may descend downward beyond the fourth contacting part 142E2 of the fourth link member 142 to be located in the lower position with respect to the fourth contacting part 142E2.

More specifically, the projection 141E of the third link member 141 contacts the third contacting part 142E1 in the fourth link member 142, and the third link member 141 and the fourth link member 142 are maintained in the postures extended in the front-rear direction.

The document reader unit 103 may thus be moved from the open position to the closed position. According to the embodiment described above, the image forming apparatus 101 may retain the postures of the document reader unit 103 steadily while displacement of the document reader unit 103 from the image forming unit 102 by the urging force of the tension coil spring 143 may be restrained.

Although examples of carrying out the present disclosure have been described, those skilled in the art will appreciate that there are numerous variations and permutations of the image forming apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

What is claimed is:

1. An image forming apparatus, comprising:
    an image forming unit configured to form an image on a recording sheet;
    a document reader unit disposed above the image forming unit and pivotably supported by the image forming unit through a hinge, the document reader unit being configured to pivot between a closed position and an open position; and
a retainer configured to retain the document reader unit in the open position,
wherein the retainer comprises:
  a first link member configured to be rotatably coupled with the image forming unit through a first coupling section and with the document reader unit through a second coupling section;
  a second link member arranged in a position farther from the hinge than the first link member, the second link member being configured to be rotatably coupled with the image forming unit through a third coupling section and with the document reader unit through a fourth coupling section; and
  a tension coil spring configured to couple the first link member and the second link member with each other, and
  wherein the first link member comprises a first contacting part, the first contacting part being arranged to face and contact the second link member along a tensile direction of the tension coil spring when the document reader unit is in the closed position.

2. The image forming apparatus according to claim 1,
wherein one of the first, second, third, and fourth coupling sections includes:
  a first rotation shaft; and
  a round hole, in which the first rotation shaft is rotatably inserted;
wherein the remaining three of the first, second, third, and fourth coupling sections each includes:
  a second rotation shaft arranged on one of the first link member and the second link member; and
  an elongated hole formed in one of the image forming unit and the document reader unit, and in which the second rotation shaft mating with the elongated hole within a same one of the remaining three of the first, second, third, and fourth coupling sections is inserted movably in a direction orthogonal to an extending direction of the second rotation shaft; and
wherein the first link member comprises a second contacting part configured to contact the second link member when the document reader unit is at an intermediate position between the open position and the closed position.

3. The image forming apparatus according to claim 2,
wherein the first coupling section includes the first rotation shaft and the round hole, and
wherein each of the second, third, and fourth coupling sections includes the second rotation shaft and the elongated hole mating with the second rotation shaft.

4. The image forming apparatus according to claim 3,
wherein the second contacting part includes a first cam edge formed on one of longitudinal ends of the first link member closer to the second link member;
wherein the second link member comprises a second cam edge formed on one of longitudinal ends of the second link member closer to the first link member, the second cam edge being arranged to contact the first cam edge; and
wherein a length being a longitudinal dimension of the elongated hole in the third coupling section is greater than a travel distance for the second rotation shaft inserted in the mating elongated hole to move when the first cam edge climbs over the second cam edge.

5. The image forming apparatus according to claim 2,
wherein the first link member comprises a first engageable part at a first end area thereof including the first coupling section, the first engageable part being configured to be engaged with one end of the tension coil spring, and
wherein the second link member comprises a second engageable part at a second end area thereof including the fourth coupling section, the second engageable part being configured to be engaged with the other end of the tension coil spring.

6. The image forming apparatus according to claim 5,
wherein, when the document reader unit is in the closed position, the first engageable part is in a lower position with respect to a rotation shaft being one of the first rotation shaft and the second rotation shaft included in the first coupling section.

7. The image forming apparatus according to claim 5,
wherein, when the document reader unit is in the closed position, a rotation shaft being one of the first rotation shaft and the second rotation shaft included in the third coupling section is in an upper position with respect to the tension coil spring.

8. The image forming apparatus according to claim 2,
wherein the third coupling section includes:
  the second rotation shaft arranged on the second link member; and
  the elongated hole formed in the image forming unit, in which the second rotation shaft is inserted movably in the direction orthogonal to the extending direction of the second rotation shaft; and
wherein the elongated hole in the third coupling section is formed to incline to be lower at a side closer to the hinge and higher at a side farther from the hinge.

9. An image forming apparatus, comprising:
an image forming unit configured to form an image on a recording sheet;
a document reader unit disposed above the image forming unit and pivotably supported by the image forming unit through a hinge, the document reader unit being configured to pivot between a closed position and an open position; and
a retainer configured to retain the document reader unit in the open position,
wherein the retainer comprises:
  a first link member configured to be rotatably coupled with the image forming unit through a first coupling section and with the document reader unit through a second coupling section;
  a second link member arranged in a position farther from the hinge than the first link member, the second link member being configured to be rotatably coupled with the image forming unit through a third coupling section and with a middle area of the first link member through a fourth coupling section ; and
  a tension coil spring configured to couple the first link member and the second link member with each other, and
wherein the second link member comprises a first contacting part, the first contacting part being arranged to face and contact a projection formed in the middle area of the first link member along a tensile direction of the tension coil spring when the document reader unit is in the closed position.

10. The image forming apparatus according to claim 9,
wherein one of the first, second, third, and fourth coupling
   sections includes:
   a first rotation shaft; and
   a round hole, in which the first rotation shaft is rotatably inserted;
wherein the remaining three of the first, second, third, and fourth coupling sections each includes:
   a second rotation shaft arranged on one of the first link member and the second link member; and
   an elongated hole formed in one of the image forming unit and the document reader unit, and in which the second rotation shaft mating with the elongated hole within a same one of the remaining three of the first, second, third, and fourth coupling sections is inserted movably in a direction orthogonal to an extending direction of the second rotation shaft; and
wherein the second link member comprises a second contacting part configured to contact the projection in the first link member when the document reader unit is at an intermediate position between the open position and the closed position.

11. The image forming apparatus according to claim 10,
wherein the first coupling section includes the first rotation shaft and the round hole, and
wherein each of the second, third, and fourth coupling sections includes the second rotation shaft and the elongated hole mating with the second rotation shaft.

* * * * *